US011023982B2

(12) United States Patent
Selvaraj et al.

(10) Patent No.: US 11,023,982 B2
(45) Date of Patent: Jun. 1, 2021

(54) METHOD TO EFFICIENTLY CATEGORIZE, EXTRACT AND SETUP OF PAYROLL TAX NOTICES

(71) Applicant: ADP, LLC, Roseland, NJ (US)

(72) Inventors: Praison Selvaraj, Hyderabad (IN); Manoj Kumar Jha, Hyderabad (IN); Harshvardhan Prasad, Hyderabad (IN)

(73) Assignee: ADP, LLC, Roseland, NJ (US)

( * ) Notice: Subject to any disclaimer, the term of this patent is extended or adjusted under 35 U.S.C. 154(b) by 189 days.

(21) Appl. No.: 16/033,431

(22) Filed: Jul. 12, 2018

(65) Prior Publication Data

US 2020/0020046 A1 Jan. 16, 2020

(51) Int. Cl.
*G06Q 10/06* (2012.01)
*G06Q 40/00* (2012.01)
*G06F 40/40* (2020.01)
*G06F 40/295* (2020.01)

(52) U.S. Cl.
CPC ......... *G06Q 40/123* (2013.12); *G06F 40/295* (2020.01); *G06F 40/40* (2020.01)

(58) Field of Classification Search
CPC ..... G06Q 40/123; G06Q 40/295; G06F 40/40
See application file for complete search history.

(56) References Cited

U.S. PATENT DOCUMENTS

| | | | | |
|---|---|---|---|---|
| 6,918,499 B2* | 7/2005 | De Land | ................ | A47B 96/04 211/103 |
| 7,246,711 B1* | 7/2007 | Metcalf | .................. | A47B 45/00 211/106.01 |
| 8,594,835 B2* | 11/2013 | Lert | ...................... | B65G 1/1371 700/221 |
| 9,418,267 B1* | 8/2016 | Josey | ..................... | G06Q 10/06 |
| 2001/0032076 A1* | 10/2001 | Kursh | ................ | H04M 15/745 704/257 |
| 2004/0055514 A1* | 3/2004 | De Land | ............... | A47F 5/0018 108/108 |
| 2004/0133483 A1* | 7/2004 | Potter | ................. | G06Q 10/087 705/28 |
| 2008/0164310 A1* | 7/2008 | Dupuy | .................. | G06Q 30/02 235/385 |
| 2013/0048724 A1* | 2/2013 | Burnside | .............. | G07G 1/0054 235/385 |
| 2013/0096735 A1* | 4/2013 | Byford | ................ | G05D 1/0234 701/2 |
| 2017/0091704 A1* | 3/2017 | Wolf | ...................... | G06Q 50/28 |
| 2017/0116552 A1* | 4/2017 | Deodhar | .......... | G06Q 10/06316 |
| 2018/0033093 A1* | 2/2018 | Maculan | ................ | H04L 67/06 |
| 2018/0365642 A1* | 12/2018 | Bonner | ............... | G06Q 10/087 |
| 2019/0108474 A1* | 4/2019 | Tripathi | ................ | G01B 21/20 |
| 2019/0172154 A1* | 6/2019 | Lee | ......................... | G06Q 40/10 |
| 2019/0213212 A1* | 7/2019 | Adato | .................. | G06F 16/235 |
| 2019/0340703 A1* | 11/2019 | West | ..................... | G06Q 20/00 |

* cited by examiner

*Primary Examiner* — Talia F Crawley
(74) *Attorney, Agent, or Firm* — Patrick J. Daugherty; Daugherty & Del Zoppo Co. LPA (57) ABSTRACT

Aspects of the present invention provide devices that process payroll tax notices by extracting payroll tax notice attributes and named entities from text of a payroll tax notice document using natural language processing, named entity recognition, and the labels of entities identified by way of machine comprehension. The devices generate a structured payroll tax notice summary based on the extracted payroll tax notice attributes and user context that identify a receiving taxed entity, a tax jurisdiction, and a taxing agency.

17 Claims, 3 Drawing Sheets

METHOD TO EFFICIENTLY CATEGORIZE, EXTRACT AND SETUP OF PAYROLL TAX NOTICES

BACKGROUND

The field of Human Capital Management (HCM) includes payroll tax notice processing from various taxing agencies concerning payroll taxes owed by a taxed entity, such as a company or organization.

The taxing agencies of various levels of government, such as federal, state, county, school, municipal, etc., send payroll tax notices regarding such topics as taxes due, a refund paid, taxes paid, changes in taxes, changes in processing of taxes, etc., to each taxed entity that includes a payroll. Each payroll tax notice is a document, which includes text, and can include graphics. The payroll tax notices can be a single or a multi-page document, which can be complex and difficult to understand.

Each taxing agency operates independently of other taxing agencies concerning payroll tax notices. That is, each agency can structure their payroll tax notice differently, and the structure or format from any taxing agency can change without notice. Each tax notice received by the taxed entity or by a third party on behalf of the taxed entity must be carefully considered to ensure compliance.

The taxed entity can receive a large number of payroll tax notices, particularly from national or international based taxing agencies. A conventional approach to reducing the processing burden on the taxed entity is to use a set of electronic templates that spatially identify information in each payroll tax notice. The spatially identified information in each payroll tax notice are extracted and presented for review.

BRIEF SUMMARY

In one aspect of the present invention, a computer-implemented method for processing payroll tax notices includes executing on a computer processor extracting payroll tax notice attributes and named entities from text of a payroll tax notice document using natural language processing and named entity recognition, and generating a structured payroll tax notice summary based on the extracted payroll tax notice attributes that identify a receiving taxed entity, a tax jurisdiction, and a taxing agency.

In another aspect, a system has a hardware processor, computer readable memory in circuit communication with the processor, and a computer-readable storage medium in circuit communication with the processor and having program instructions stored thereon. The processor executes the program instructions stored on the computer-readable storage medium via the computer readable memory and thereby processes payroll tax notices, which extracts payroll tax notice attributes and named entities from text of a payroll tax notice document using natural language processing and named entity recognition, and generates a structured payroll tax notice summary based on the extracted payroll tax notice attributes that identify a receiving taxed entity, a tax jurisdiction, and a taxing agency.

In another aspect, a computer program product for processing payroll tax notices has a computer-readable storage medium with computer readable program code embodied therewith. The computer readable hardware medium is not a transitory signal per se. The computer readable program code includes instructions for execution by a processor that cause the processor to extract payroll tax notice attributes and named entities from text of a payroll tax notice document using natural language processing and named entity recognition, and to generate a structured payroll tax notice summary based on the extracted payroll tax notice attributes that identify a receiving taxed entity, a tax jurisdiction, and a taxing agency.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

The present invention may be a system, a method, a computer program product, and combinations thereof. The computer program product may include a computer readable storage medium (or media) having computer readable program instructions thereon for causing a processor to carry out aspects of the present invention.

Figure 1:
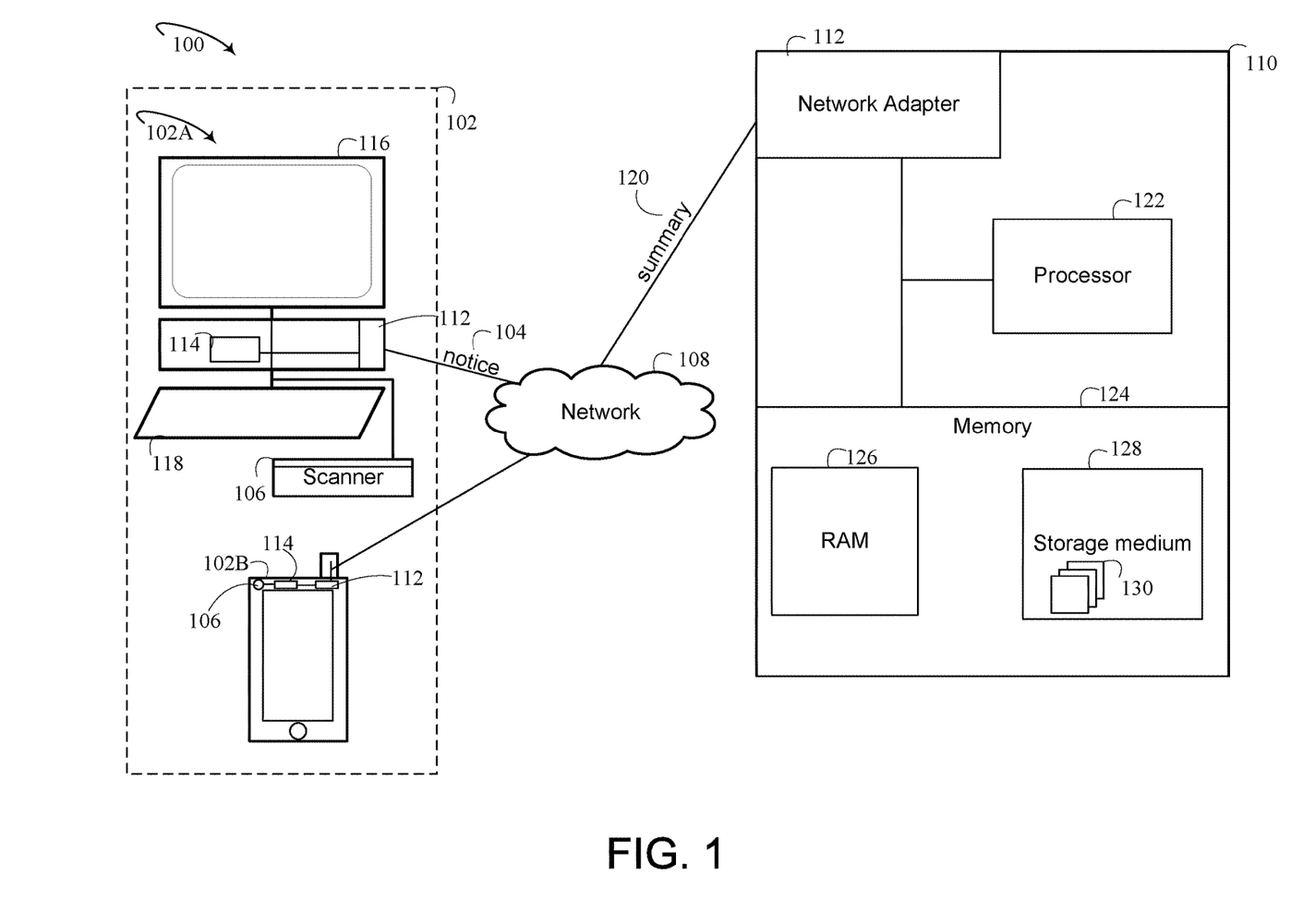
FIG. 1 depicts a schematic illustration of system aspects according to an embodiment of the present invention.

With reference to FIG. 1, a schematic of an embodiment of a system 100 for processing payroll tax notices is depicted. The system 100 includes a local computing device 102, such as, for example, a desktop computer 102A, laptop computer, personal digital assistant, tablet, smartphone 102B, cellular telephone, body worn device, and the like. The local computing device 102 receives an electronic image of a payroll tax notice 104. The payroll tax notice 104 can be converted from a paper document by an imaging device 106 communicatively attached to the local computing device 102, such as a scanner, a copier, a camera, and the like. In some embodiments, the payroll tax notice 104 can be received electronically directly from a taxing agency or a representative thereof. The electronic image of the payroll tax notice 104 can include an image format, such as, for example, a portable document format (PDF), JPEG, PNG, GIF, TIFF, BMP, WebP, PPM, and the like.

The local computing device 102 transfers the image of the payroll tax notice 104 over a network 108 to a computer server 110. The computer server 110 performs optical character recognition (OCR) on the image format of the payroll tax notice 104, which generates text. In some embodiments, the local computer device 102 performs the OCR on the image format of payroll tax notice 104, and the text is transferred over the network 112 to the computer server 110. In some embodiments, the payroll tax notice 104 is received as an electronic document including character encoding of text. For example, the payroll tax notice 104 is received with a UTF-8 encoding of characters and OCR is omitted. The text can be represented as a string of encoded characters. Embedded images not representing characters within the document can be removed. For example, an image of a state seal can be removed.

The local computing device 102 includes a network interface adapter, a processor 114, a display device 116 and one or more input devices 118, such as a keyboard, touch screen, mouse, microphone, and the like. The local computing device 102 can include displays on the display device 116 and inputs from the input devices 118 to image and transfer the payroll tax notice 104 to the computer server 110.

The computer server 110 extracts payroll tax notice attributes and named entities from the text of the payroll tax notice 104 using natural language processing (NLP) and named entity recognition (NER). The NLP of the text can include tokenizing of words, sentences, and paragraphs, sentence recognition or splitting, part of speech tagging, geographic labeling, and co-reference resolution. Examples of suitable NLP algorithms can include Java® (Java is a registered trademark of Oracle America, Inc.) programming language based open source software "General Architecture for Text Engineering" (GATE); Python/Cython programming language based open source library "spaCy" licensed by Massachusetts Institute of Technology (MIT); and Java® programming language based Stanford Natural Language Processing Group software. Extracted attributes include nouns or noun phrases, labels, amounts and dates.

The NER of the text can include entity identification, entity chunking and entity extraction, such as identification of entities of persons, organizations, and locations including the noun or noun phrases of text of the payroll tax notice 104. For example, a named organization can include the "Ohio Department of Taxation," and a named location can include a state name, such as "Ohio." Examples of NER algorithms can include the Java® programming language and GATE programming environment based "A Nearly-New Information Extraction" (GATE/ANNIE); the Python/Cython programming language based "spaCy"; and the Java® programming language based Stanford Natural Language Processing Group software.

The computer server 110 generates a structured payroll tax notice summary 120 based on the extracted payroll tax notice attributes that identify a receiving taxed entity, a tax jurisdiction, and a taxing agency. The structured payroll tax notice summary 120 includes data fields populated according to the extracted attributes. Each data field in the summary includes atomic or indivisible values in a single domain of values. The data fields can include a name of the taxed entity, a state of the tax jurisdiction, a tax type of the tax jurisdiction, a jurisdiction identifier of the tax jurisdiction, a name of the taxing agency, a mailing address of the taxing agency, a date of the payroll tax notice 104, a tax period covered by the payroll tax notice 104, a form identifier of the payroll tax notice 104, an amount due from the taxed entity, an amount of tax due from the taxed entity, and an amount of penalty and interest due from the taxed entity.

For example, a name of the receiving taxed entity is an electronically delimited field that contains only the name of the receiving taxed entity. Each data field in the summary is directly identified by a variable or pointer with computer readable instructions. For example, a variable of "name.taxed.entity" in the programming language Java® can identify a character representation of the name of the taxed entity within the structured payroll tax notice summary 120, such as "Company ABC". The computer server 110 transmits the structured payroll tax notice summary 120 to the local computing device 102.

The local computing device 102 displays the structured payroll tax notice summary 120 on the display device 116. The local computing device 102 can accept input from the input device 118, which modifies one or more displayed data fields. The local computing device 102 can accept input, which causes further processing of the payroll tax notice 102, such as to initiate payment processing of the amount due from the taxed entity. The data fields of the structured payroll tax notice summary 120 are presented in a predetermine order independent of the taxing agency issuing the payroll tax notice 104. The data fields can be presented in predetermined spatial locations on the display.

Extracting payroll tax notice attributes and named entities from the text of the payroll tax notice 104 using NLP and NER do not depend on spatial relationships used in conventional templates. For example, as a new payroll tax notice format is introduced by a taxing agency, NLP and NER can process the new format based on the context of the text rather than the spatial location of key pieces of information that can change without notice. Time and resources for adding or changing a template are not required to accommodate changes in formats of payroll tax notices 104 using NLP and NER.

The lines of the schematic illustrate communication paths between devices and between components with each device. Communication paths between the local computing device 102 and the computer server 110 over the network 108 include a network interface device 112 in each device, such as a network adapter, network interface card, wireless network adapter, and the like.

The computer server 110 includes a processor 122 configured with instructions stored in a memory 124. The processor 122 of the computer server 110 and the processor 114 of the local computing device include, for example, a digital processor, an electrical processor, an optical processor, a microprocessor, a single core processor, a multi-core processor, distributed processors, parallel processors, clustered processors, combinations thereof and the like. The memory 124 includes a computer readable memory 126 and a computer readable storage medium 128.

The computer readable storage medium 128 can be a tangible device that retains and stores instructions for use by an instruction execution device, such as the processor 122. The computer readable storage medium 128 may be, for example, but is not limited to, an electronic storage device, a magnetic storage device, an optical storage device, an electromagnetic storage device, a semiconductor storage device, or any suitable combination of the foregoing. A computer readable storage medium 128, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be transmitted to respective computing/processing devices from the computer readable storage medium 128 or to an external computer or external storage device via the network 108. The network 108 can include private networks, public networks, wired networks, wireless networks, data networks, cellular networks, local area networks, wide area networks, the Internet, and combinations thereof. The network interface device 112 in each device receives computer readable program instructions from the network 108 and forwards the computer readable program instructions for storage in the computer readable storage medium 128 within the respective computing/processing device.

Computer readable program instructions for carrying out operations of the present invention may include assembler instructions, instruction-set-architecture (ISA) instructions, machine instructions, machine dependent instructions, microcode, firmware instructions, state-setting data, configuration data for integrated circuitry, compiled or interpreted instructions, source code or object code written in any combination of one or more programming languages or programming environments, such as Java®, Javascript, C, C#, C++, Python, Cython, F#, PHP, HTML, Ruby, and the like.

The computer readable program instructions may execute entirely on the computer server 110, partly on the computer server 110, as a stand-alone software package, partly on the computer server 110 and partly on the local computing device 102 or entirely on the local computing device 102. For example, the local computing device 102 can include a web browser that executes HTML instructions transmitted from the computer server 110, and the computer server executes Java® instructions that construct the HTML instructions. In another example, the local computing device 102 includes a smartphone application, which includes computer readable program instructions to perform imaging and transfer of the payroll tax notice 104, and the computer server 110 includes different computer readable program instruction to receive and process the transferred payroll tax notice 104.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine ("a configured processor"), such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The memory 124 can include a variety of computer system readable media. Such media may be any available media that is accessible by computer server 110, and the media includes volatile media, non-volatile media, removable, non-removable media, and combinations thereof. Examples of the volatile media can include random access memory (RAM) and/or cache memory. Examples of non-volatile memory include magnetic disk storage, optical storage, solid state storage, and the like. As will be further depicted and described below, the memory 124 can include at least one program product having a set (e.g., at least one) of program modules 130 that are configured to carry out the functions of embodiments of the invention.

Figure 2:
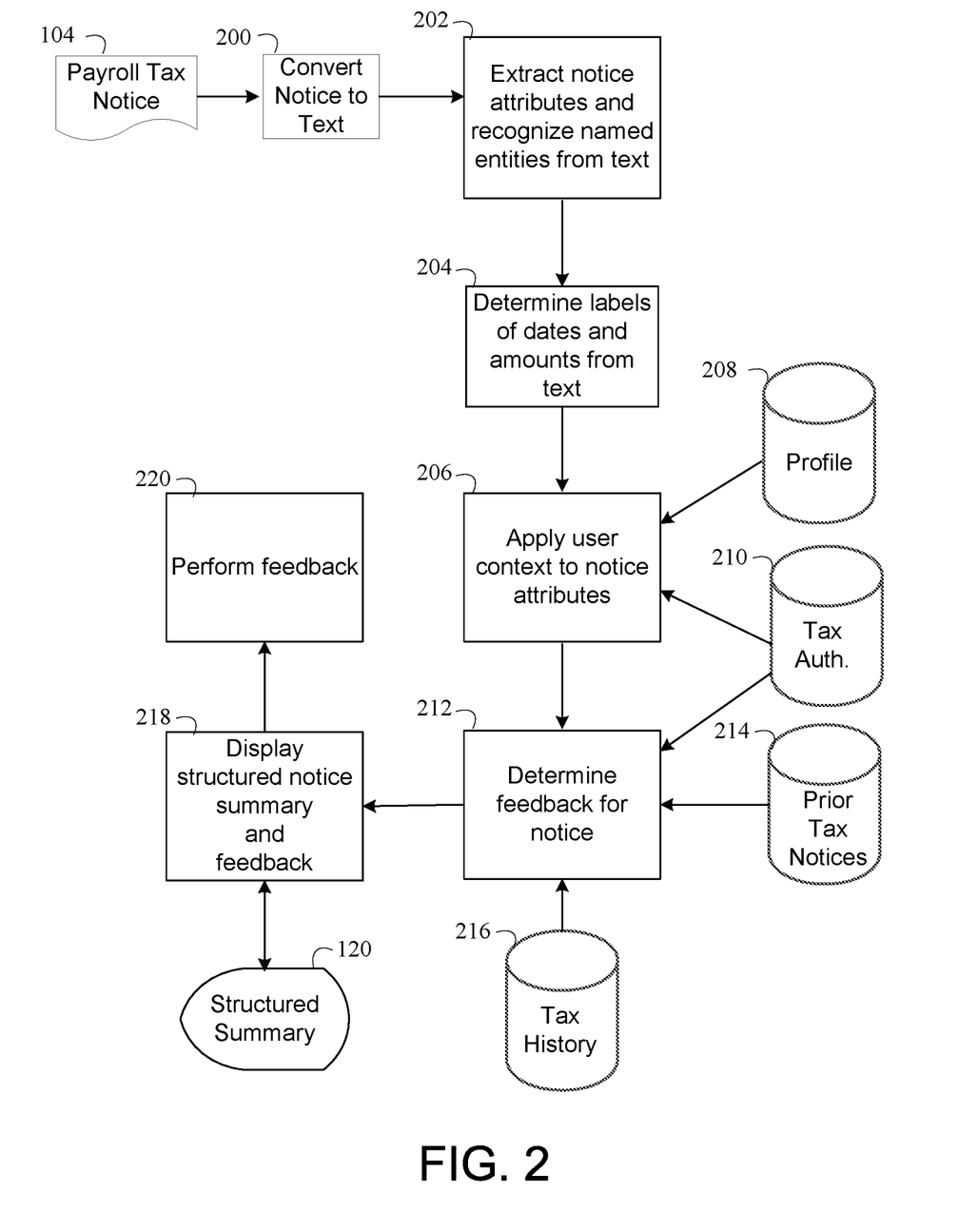
FIG. 2 is a flow chart illustration of an embodiment of the present invention.

FIG. 2 illustrates one embodiment of a method according to the present invention for processing payroll tax notices. At 200, a processor that is configured according to an aspect of the present invention (the "configured processor") converts the payroll tax notice 104 received as an image to text using optical character recognition (OCR). The payroll tax notice 104 can be received as a paper document and then converted to the image by the imaging device 106.

At 202, the configured processor extracts payroll tax notice attributes and named entities from text of a payroll tax notice document using natural language processing and named entity recognition. Extracted attributes can include a name of the taxed entity, a state of the tax jurisdiction, a tax type of the tax jurisdiction, a jurisdiction identifier of the tax jurisdiction, a name of the taxing agency, a mailing address of the taxing agency, a date of the payroll tax notice 104, a tax period covered by the payroll tax notice 104, a form identifier of the payroll tax notice 104, an amount of tax due from the taxed entity, an amount of interest and penalty due from the taxed entity, and an amount due from the taxed entity.

The extracted attributes can include a plurality of entities, a plurality of amounts, a plurality of dates and combinations thereof. The extracted attributes of dates can include different date formats, such as National and International Gregorian formatted dates (e.g. MM/DD/YYYY, MM/DD/YY, YYYY/MM/DD), written out dates (e.g. "Jun. 5, 2018"), time periods and abbreviated time period (e.g. second quarter, 2QTR), and the like.

At 204, the configured processor can determine labels for each of the plurality of dates and the plurality of amounts included in the text of the payroll tax notice 104 using machine comprehension (MC). For example, a first label of "notice date" can be applied to a first extracted date, and a second label of "due date" can be applied to a second extracted date based on context. A third label of "tax period" can be applied to a third extracted date based on context.

The MC can include a deep semantic natural language processing bi-directional attention flow (BIDAF) network. The BIDAF network provides a multi-stage hierarchical process that represents the context of the amount or the date at different levels of granularity and uses bidirectional attention flow mechanism to obtain a query-aware context representation without early summarization. Other techniques can include logistic regression baseline, dynamic chunk reader, fine-grained gating, match-LSTM, multi-perspective matching, dynamic coattention networks, and R-Net. Questions of the BIDAF network can be formatted according to the data fields of the structured payroll tax notice summary 120. For example, "what is the due date?", "what is the date of the notice?", "What is the taxed period for the notice?", etc.

At 206, the configured processor applies a context to the extracted attributes and identified entities, which can include clarifying or distinguishing named entities. A user context, obtained by the logged-in user's profile, can be applied to named entities from the NER, which identifies the receiving taxed entity for which a user profile 208 indicates authorization to process payroll tax notices. For example, a user profile of user "Frank" indicates the user "Frank" is authorized to process the payroll tax notices 104 for taxed entities of "company XYZ," "company DEF," and "company LMN." The taxed entities from the user profile 208 are matched with the named entities recognized by the NER. Processing continues where a match between the user profile 208 and the named entities is present, and an informational message is returned otherwise. Applying the context can include distinguishing among a plurality of named entities. For example, "company DEF" is present both in one of the named entities and in the user profile 208 of "Frank" In some embodiments, the taxed entity can include a company name, an account number with the taxing agency, and combinations thereof.

The user context can be applied to other named entities, such as the taxing authority. In some embodiments, the user profile 208 includes taxing authorities for which the user is authorized to process the payroll tax notices 104. In some embodiments, apply the context includes validating the named taxing authority with a database of taxing authorities 210. The database of taxing authorities 210 can include attributes of an agency name, a taxing jurisdiction, and an agency address (e.g. payroll tax remittance address). In some embodiments, the database 210 of taxing authorities can include attributes of valid notice form numbers, valid tax periods, valid tax type, valid state of jurisdiction, and valid jurisdiction identifier (i.e. alphanumeric identifier of geographic region). Validating includes verifying the entity of the taxing authority from the NER is present in the database of taxing authorities. Validating can include verifying that values of the extracted attributes according to the identified taxing authority are included in the values of the database 210 of taxing authorities.

At 212, the configured processor determines feedback for the received payroll tax notice based on the extracted attributes and one or more databases, such as a database of prior tax notices 214, a database of tax history 216, the database of taxing authorities 210, or combinations thereof. The feedback can include a next step or action in response to the received payroll tax notice 104, identification of errors in information presented within the payroll tax notice 104, validations of information presented within the payroll tax notice 104 according to the databases, non-validation or conflicts of information presented within the payroll tax notice 104 according to the databases, and combinations thereof.

At 218, the configured processor generates the structured payroll tax notice summary 120, which is displayed on the display device 116. The structured payroll tax notice summary 120 includes the data fields populated from the extracted attributes.

The structured payroll tax notice summary 120 can include one or more visual indicators of the determined feedback. The visual indicators can include data field specific feedback, general payroll tax notice feedback, and combinations thereof.

The general payroll tax notice feedback can include that: the payroll tax notice 104 includes a tax due to the taxed entity that is not previously paid according to the database of payroll tax history 216 and should be paid; the payroll tax notice 104 is a duplicate of a cited prior payroll tax notice according to the database of prior tax notices 214; the payroll tax notice 104 includes a valid refund according to the database of payroll tax history 216, which can be deposited; the payroll tax notice 104 includes only information and no further action by the taxed entity is required; the payroll tax notice 104 includes a taxing agency error in at least one identified attribute of the extracted attributes; a break-up of the amount due as a tax amount due, and a penalty and interest amount due can be found in the tax notice; the payroll tax notice can be a first, second, third, lien/levy or final notice with an increasing order of priority for the payroll tax notice to be resolved, and combinations thereof.

For example, the database of tax history 216 includes prior payments and account numbers used. The visual indicator of the feedback can include a message, such as "Contact the taxing agency to correct the account number." The message is according to a validation of the account number in the user profile 208 and/or the account number previously used according to the database of tax history 216, which is different than the account number in the payroll tax notice 104. The message can include a visual representation of the account number according to the payroll tax notice 104, for example, "On page 1, paragraph 4 of the notice the account number is 98-7654321." The message can include a visual representation of the account number valid according to prior use in the database of tax history 216 and/or according to authorized use in the user profile 208, such as "according to prior payments to taxing agency ABC, the account number is 89-7654321."

The visual indicator of feedback can include a processing indicator for further processing according to the feedback. For example, a feedback message to correct an account number can include the processing indicator, for example, of a button labeled "taxing agency XYZ account correction form."

At 220, the configured processor performs the further processing in response to an input from the input device 118 selecting the processing indicator. The further processing can include processing a tax payment in response to the payroll tax notice 104, processing a refund in response to the payroll tax notice 104, preparing a reply to the payroll tax notice 104 identifying an error to the taxing agency, etc.

Figure 3:
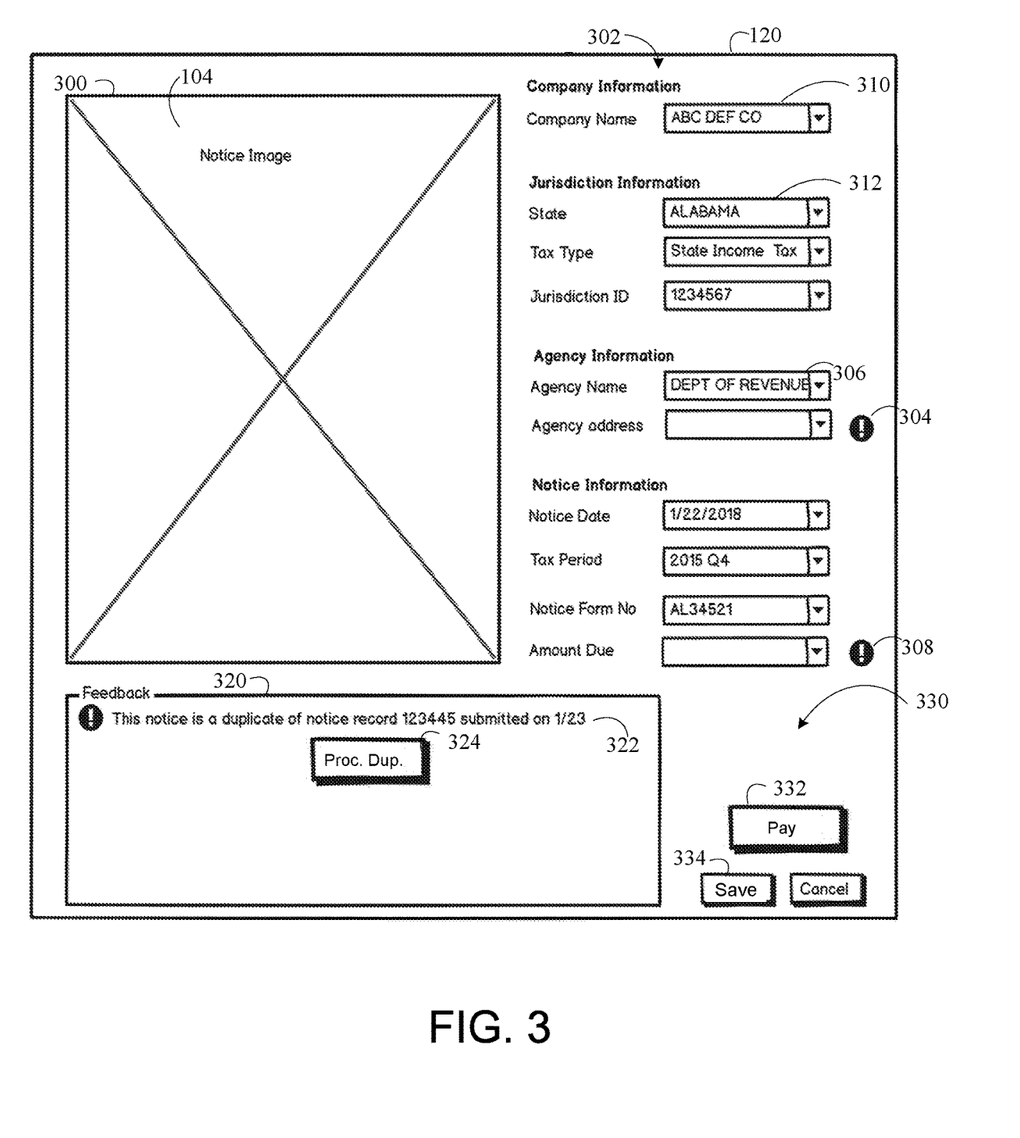
FIG. 3 depicts an example user interface according to an embodiment of the present invention.

FIG. 3 depicts an example user interface according to an embodiment of the present invention, which displays the structured payroll tax notice summary 120. The structured payroll tax notice summary 120 includes a first region 300, which displays the payroll tax notice 104.

The structured payroll tax notice summary 120 includes a second region 302, which displays the data fields and can include visual indicators of data field feedback. For example, a first visual indicator 304, for example, an icon indicates feedback for the agency address. Selecting the first visual indicator 304 with an input from the input device 118 can, for example, indicate that the address cannot be determined or is inconsistent with a known address of the taxing agency (e.g. safeguard for fraud) populated in a taxing agency data field 306 and according to the database of taxing authorities 210. In another example, a second visual indicator 308 indicates an error with an amount due data field. In response to selecting the second visual indicator 308 with an input from the input device 118, the configured processor can, for example, display a message in a pop-up window that the amount due was previously paid according to the database of tax history 216.

The data fields can be populated from the extracted attributes. For example, "ABC DEF CO" is populated in the company name data field 310, "ALABAMA" is populated in the state of the tax jurisdiction 312 from the named entities. A set of rules can provide whether the data field is populated from the extracted attributes and/or the visual indicator for a corresponding data field is included.

For example, if the extracted attribute, such as a taxing agency name, is validated, then the data field is populated. If feedback is determined from additional information, such as anticipated name change in the taxing agency name, then the visual indicator is included. If feedback includes a conflict, such as an inconsistent agency address with the taxing agency, then populating the data field is excluded and the visual indicator is included. Populating the data field can be based on a predetermined threshold probability that manual entry is likely.

The structured payroll tax notice summary 120 includes a third region 320, which can display general feedback. For example, a third visual indicator 322 includes an icon and a message "This notice is a duplicate of notice record 123445 submitted on January 23." The visual indicator can include a processing indicator 324, which indicates further processing. For example, in response to selecting a corresponding icon or processing indicator 324 with an input from the input device 118, a reply is generated to the taxing agency indicating receipt of a duplicate notice.

The structured payroll tax notice summary 120 includes a fourth region 330, which allows default processing and/or further control of the structured payroll tax notice summary 120. For example, an indicator for paying a payroll tax 332 can invoke accounts payable processing of a remittance. Controls 334 can include intermediate control of the structured payroll tax notice summary 120, such as saving the currently displayed data fields and feedback for later processing, resetting the structured payroll tax notice summary 120 data fields, accessing other information sources, etc.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for processing payroll tax notices, comprising executing on a computer processor:
   extracting payroll tax notice attributes and named entities from text of a payroll tax notice document using natural language processing and named entity recognition;
   selecting one of the named entities as an authorized receiving taxed entity by validating a notice form number of the extracted payroll tax notice attributes, matching the one of the named entities to at least one taxed entity for which a user profile value indicates authorization to process payroll tax notices within user context data of a user receiving the payroll tax notice document, and matching a state of tax jurisdiction of the one of the named entities to a state of a tax jurisdiction extracted from the payroll tax notice attributes;
   determining a feedback action for the received payroll tax notice as function of the extracted payroll tax notice attributes, the authorized receiving taxed entity, and a tax history;
   generating on a graphical user interface display device a structured payroll tax notice summary based on the extracted payroll tax notice attributes that displays the payroll tax notice document and identifications of the authorized receiving taxed entity, the state of the tax jurisdiction of the authorized receiving taxed entity, a taxing agency, the feedback action, and a visual indicator; and
   in response to selection of the visual indicator via a graphical user interface input, executing a processing action that is associated to one of the feedback action and an error with a value determined for a data field of the structured payroll tax notice summary from the extracted payroll tax notice attributes.

2. The method of claim 1, further comprising:
   determining labels for each of a plurality of dates included in the text of the payroll tax notice document using machine comprehension; and
   wherein generating the structured payroll tax notice summary comprises displaying fields of a payroll tax notice date and a tax period, wherein the payroll tax notice date and the tax period are selected from the plurality of dates according to the determined labels.

3. The method of claim 1, further comprising:
   determining labels for each of a plurality of amounts included in the text of the payroll tax notice document using machine comprehension; and
   wherein generating the structured payroll tax notice summary comprises displaying a field of an amount due, wherein the amount due is selected from the plurality of amounts according to the determined labels.

4. The method of claim 1, further comprising:
   determining the feedback action for the received payroll tax notice to comprise one of an identification of an error in the value of the extracted payroll tax notice attributes, a validation of the value of the extracted payroll tax notice attributes, and a non-validation of the value of the extracted payroll tax notice attributes.

5. The method of claim 4, wherein the determined feedback action identified within the structured payroll tax notice summary includes information selected from a group consisting of:
   the payroll tax notice includes a tax due to the taxed entity that is not previously paid according to payroll tax history and should be paid;
   a break-up of the amount due as a tax amount due, and a penalty and interest amount due can be found in the payroll tax notice;
   the payroll tax notice can be a first, second, third, lien/levy or final notice with an increasing order of priority for the payroll tax notice to be resolved;
   the payroll tax notice is a duplicate of a cited prior payroll tax notice;
   the payroll tax notice includes a valid refund according to a payroll tax history which can be deposited;
   the payroll tax notice includes information and no further action by the taxed entity is required; and
   the payroll tax notice includes a taxing agency error in at least one identified attribute of the extracted attributes.

6. The method of claim 1, wherein the extracted attributes comprise at least one attribute selected from a group consisting of: a name of the taxed entity, a tax type of the tax jurisdiction, a jurisdiction identifier of the tax jurisdiction, a name of the taxing agency, a mailing address of the taxing agency, a date of the payroll tax notice, a tax period of the payroll tax notice, a form identifier of the payroll tax notice, an amount due according to the payroll tax notice, an amount of tax due from the taxed entity, and an amount of penalty and interest due from the taxed entity.

7. The method of claim 4, wherein the processing action associated to the feedback action is selected from the group consisting of processing a tax payment in an amount of the value of the extracted payroll tax notice attributes, processing a refund in the amount of the value of the extracted payroll tax notice attributes, and generating a reply to the taxing agency that identifies an error in the amount of the value of the extracted payroll tax notice attributes.

8. A system for processing payroll tax notices, comprising:
   a processor;
   a computer readable memory in circuit communication with the processor; and
   a computer readable storage medium in circuit communication with the processor;
   wherein the processor executes program instructions stored on the computer-readable storage medium via the computer readable memory and thereby:
   extracts payroll tax notice attributes and named entities from text of a payroll tax notice document using natural language processing and named entity recognition;
   selects one of the named entities as an authorized receiving taxed entity by validating a notice form number of the extracted payroll tax notice attributes, matching one of the named entities to at least one taxed entity for which a user profile value indicates authorization to process payroll tax notices within user context data of a user receiving the payroll tax notice document, and matching a state of tax jurisdiction of the one of the named entities to a state of a tax jurisdiction extracted from the payroll tax notice attributes;
   determines a feedback action for the received payroll tax notice as function of the extracted payroll tax notice attributes, the authorized receiving taxed entity, and a tax history;
   generates on a graphical user interface display device a structured payroll tax notice summary based on the extracted payroll tax notice attributes that displays the payroll tax notice document and identifications of the authorized receiving taxed entity, the state of the tax jurisdiction the authorized receiving taxed entity, and a taxing agency, the feedback action, and a visual indicator; and
   in response to selection of the visual indicator via a graphical user interface input, executes a processing action that is associated to one of the feedback action and an error with a value determined for a data field of the structured payroll tax notice summary from the extracted payroll tax notice attributes.

9. The system of claim 8, wherein the processor executes program instructions stored on the computer-readable storage medium via the computer readable memory and thereby:
   determines labels for each of a plurality of dates included in the text of the payroll tax notice document using machine comprehension; and
   wherein the generated structured payroll tax notice summary comprises displayed fields of a payroll tax notice date and a tax period, wherein the payroll tax notice date and the tax period are selected from the plurality of dates according to the determined labels.

10. The system of claim 8, wherein the processor executes program instructions stored on the computer-readable storage medium via the computer readable memory and thereby:
    determines labels for each of a plurality of amounts included in the text of the payroll tax notice document using machine comprehension; and
    wherein the generated structured payroll tax notice summary comprises a displayed field of an amount due, wherein the amount due is selected from the plurality of amounts according to the determined labels.

11. The system of claim 8, wherein the processor executes program instructions stored on the computer-readable storage medium via the computer readable memory and thereby:
    determines the feedback action for the received payroll tax notice to comprise one of an identification of an error in the value of the extracted payroll tax notice attributes, a validation of the value of the extracted payroll tax notice attributes, and a non-validation of the value of the extracted payroll tax notice attributes.

12. The system of claim 11, wherein the determined feedback action identified within the structured payroll tax notice summary includes information selected from a group consisting of:
    the payroll tax notice includes a tax due to the taxed entity that is not previously paid according to payroll tax history and should be paid;
    a break-up of the amount due as a tax amount due, and a penalty and interest amount due can be found in the payroll tax notice;
    the payroll tax notice can be a first, second, third, lien/levy or final notice with an increasing order of priority for the payroll tax notice to be resolved;
    the payroll tax notice is a duplicate of a cited prior payroll tax notice;
    the payroll tax notice includes a valid refund according to a payroll tax history which can be deposited;
    the payroll tax notice includes information and no further action by the taxed entity is required; and the payroll tax notice includes a taxing agency error in at least one identified attribute of the extracted attributes.

13. A computer program product for processing payroll tax notices, the computer program product comprising:
- a computer readable storage medium having computer readable program code embodied therewith, wherein the computer readable storage medium is not a transitory signal per se, the computer readable program code comprising instructions for execution by a processor that causes the processor to:
- extract payroll tax notice attributes and named entities from text of a payroll tax notice document using natural language processing and named entity recognition;
- select one of the named entities as an authorized receiving taxed entity by validating a notice form number of the extracted payroll tax notice attributes, matching the one of the named entities to at least one taxed entity for which a user profile value indicates authorization to process payroll tax notices within user context data of a user receiving the payroll tax notice document, and matching a state of tax jurisdiction of the one of the named entities to a state of a tax jurisdiction extracted from the payroll tax notice attributes;
- determine a feedback action for the received payroll tax notice as function of the extracted payroll tax notice attributes, the authorized receiving taxed entity, and a tax history;
- generate on a graphical user interface display device a structured payroll tax notice summary based on the extracted payroll tax notice attributes that displays the payroll tax notice document and identifications of the authorized receiving taxed entity, the state of the tax jurisdiction of the authorized receiving taxed entity, and a taxing agency, the feedback action, and a visual indicator; and
- in response to selection of the visual indicator via a graphical user interface input, execute a processing action that is associated to one of the feedback action and an error with a value determined for a data field of the structured payroll tax notice summary from the extracted payroll tax notice attributes.

14. The computer program product of claim 13, wherein the instructions for execution cause the processor to:
- determine labels for each of a plurality of dates included in the text of the payroll tax notice document using machine comprehension; and
- wherein the generated structured payroll tax notice summary comprises displayed fields of a payroll tax notice date and a tax period, wherein the payroll tax notice date and the tax period are selected from the plurality of dates according to the determined labels.

15. The computer program product of claim 13, wherein the instructions for execution cause the processor to:
- determine labels for each of a plurality of amounts included in the text of the payroll tax notice document using machine comprehension; and
- wherein the generated structured payroll tax notice summary comprises a displayed field of an amount due, wherein the amount due is selected from the plurality of amounts according to the determined labels.

16. The computer program product of claim 13, wherein the instructions for execution cause the processor to:
- determine the feedback action for the received payroll tax notice to comprise one of an identification of an error in the value of the extracted payroll tax notice attributes, a validation of the value of the extracted payroll tax notice attributes, and a non-validation of the value of the extracted payroll tax notice attributes.

17. The computer program product of claim 16, wherein the determined feedback action identified within the structured payroll tax notice summary includes information selected from a group consisting of:
- the payroll tax notice includes a tax due to the taxed entity that is not previously paid according to payroll tax history and should be paid;
- a break-up of the amount due as a tax amount due, and a penalty and interest amount due can be found in the payroll tax notice;
- the payroll tax notice can be a first, second, third, lien/levy or final notice with an increasing order of priority for the payroll tax notice to be resolved;
- the payroll tax notice is a duplicate of a cited prior payroll tax notice;
- the payroll tax notice includes a valid refund according to a payroll tax history which can be deposited;
- the payroll tax notice includes information and no further action by the taxed entity is required; and
- the payroll tax notice includes a taxing agency error in at least one identified attribute of the extracted attributes.

\* \* \* \* \*